United States Patent Office 3,518,187
Patented June 30, 1970

3,518,187
OLEOPHILIC TIN SULPHIDE
Alexsander Jerzy Groszek, Ealing, London, England, assignor to The British Petroleum Company Limited, London, England, a corporation of England
No Drawing. Filed Mar. 5, 1968, Ser. No. 710,655
Claims priority, application Great Britain, Mar. 20, 1967, 12,841/67
Int. Cl. C10m 1/12
U.S. Cl. 252—25      3 Claims

ABSTRACT OF THE DISCLOSURE

Oleophilic tin sulphides are prepared by grinding a tin sulphide in an organic liquid preferably in a ball mill. Oleophilic tin sulphides are solid lubricants. Dispersions in oil of the oleophilic tin sulphides posses load-carrying properties.

---

This invention relates to lubricating compositions, in particular it relates to novel solid lubricants and to lubricating compositions containing them.

It is known that stannic sulphide can act as a solid lubricant.

It has now been found that "oleophilic" stannous sulphide has valuable lubricant load-carrying properties.

This invention, therefore, provides oleophilic tin sulphides, and mixtures of such sulphides, prepared by grinding the sulphides in the substantial absence of air in a low surface tension, low viscosity, low boiling point organic liquid.

This invention further provides lubricating compositions based on a mineral or synthetic base oil and containing oleophilic tin sulphide as described above.

This invention yet further provides composites which comprise a metal or a solid polymeric matrix containing olephilic tin sulphides, and bearings fashioned from such composites.

The oleophilic tin sulphides, the base oils for the lubricating compositions, and the lubricating compositions according to the invention are described in detail below.

OLEOPHILIC TIN SULPHIDES

Oleophilic tin sulphides will adsorb n-dotriacontane in preference to n-butanol in contrast to non-oleophilic tin sulphides. Stannous sulphide (SnS) and stannic sulphide ($SnS_2$) and mixtures thereof can be used.

Oleophilic tin sulphides can be obtained by grinding tin sulphides in most organic liquids but it is desirable to use one the bulk of which can be easily removed from the olephilic tin sulphides. Those liquids distilling below 500° C. and having a viscosity below 600 centistokes at 100° F. (38° C.) are therefore preferred. (Liquids having a surface tension below 72 dynes/cm., preferably from 10 to 40 dynes/cm., at 25° C. are preferred.)

Suitable organic liquids are lower molecular weight hydrocarbons including straight-chain or branched-chain, saturated or unsaturated alkyl compounds, saturated or unsaturated, substituted or unsubstituted, cyclo-alkyl compounds, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of tin sulphide in the tin sulphide/organic liquid mixture should not exceed 50% wt.; preferably it should be from 2 to 20% wt.

The grinding may be carried out in any suitable grinding mill or device and it is desirable to continue the grinding until an oleophilic tin sulphide having a surface area (as determined by nitrogen adsorption) of from 5 to 400, preferably from 5 to 100, square metres per gram is obtained. Usually this can be achieved by grinding at normal temperatures for the required period but the temperature of the mixture may be artifiicially increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

Air should be excluded so far as possible during the grinding operation and this can be most easily achieved by filling the mill with the organic liquid first, followed by the balls and tin sulphide. A suitable procedure is to fill the mill with the liquid, add half the balls, then the tin sulphide and finally the rest of the balls. Such a grinding procedure might be referred to as a "closed" system.

When using a ball mill, it is of course desirable to use balls made of a material which does not react with the tin sulphide and which does not wear unduly during the grinding. Vibratory ball mills usually contain steel balls and these are suitable for the present purpose. It is preferred to use a hard grade of steel for the balls and for the grinding chamber.

A magnetic filter can be used, if necessary, to remove small steel particles that may occur in the slurry that is produced in the grinding operation. A circulatory system can also be used wherein the slurry is pumped through an external magnetic filter and then returned to the mill. The circulatory system can be run semicontinuously, the slurry being pumped out after the grinding period and fresh material added to the system.

A suitable vibratory ball mill is sold under the trade name "Megapact," manufactured by Pilamec Limited.

As an initial step the slurry of olephilic tin sulphide produced in the grinding operation can be separated from the grinding balls by sieving or by displacement of the grinding liquid by another liquid and sieving.

If a relatively high boiling organic liquid is used for grinding it may be desirable to displace this liquid by a low boiling liquid. This liquid can then be removed by boiling. It is preferred to use vigorous boiling.

It is also possible to filter the slurry to obtain a filter cake of olephilic tin sulphide.

In either case it is preferred to remove the last traces of grinding liquid or displacing liquid by heating the oleophilic tin sulphtide in a vacuum oven for several hours, for example, at 100° C. and at 1 mm. mercury.

Alternatively and, in some circumstances preferably, the grinding liquid or displacing liquid is not removed from the olephilic tin sulphide which remains in the slurry. This course is most preferred if the grinding liquid can also act as a base oil for a lubricating composition.

THE BASE OIL

The lubricating base oil may be a mineral oil or a synthetic oil.

Suitable mineral oils are refined mineral oils obtained from petroleum, for example, those having a viscosity at 210° F. within the range from 2 to 50 centistokes, preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols, such as, for example, dioctyl sebacate, dinonyl sebacate, octyl nonyl sebacate, and the corresponding azelates and adipates, liquid diesters of aliphatic dicarboxylic acids and phenols.

DISPERSION LUBRICATING COMPOSITIONS

Oleophilic tin sulphide can be incorporated into base oils in quantities up to 50% wt., preferably up to 10% wt., based on the total weight, to form dispersions or greases with surprisingly good lubricating properties.

The dispersions can be formed quite simply by stirring the oleophilic tin sulphide into the base oil. Alternatively, a mechanical aid to dispersion such as a colloid mill can be used.

The following are examples of methods by which the dispersions may be prepared:

(a) The grinding liquid is filtered off from the slurry of oleophilic tin sulphide produced in the grinding operation. The resulting filter cake is ground by, for example, feeding the cake through a colloid mill, and the resulting powder is stirred into the oil. The dispersion produced is finished by colloid milling.

(b) The grinding liquid is boiled off rapidly from the slurry of oleophilic tin sulphide to avoid the formation of a tin sulphide cake, the resulting powder is stirred into the oil and the dispersion is finished by colloid milling.

(c) Base oil is added to the slurry of oleophilic tin sulphide and the grinding liquid distilled off.

(d) Base oil is added to the slurry of oleophilic tin sulphide and the mixture circulated through a homogeniser (for example, of the Manton-Gaulin type) so that temperatures up to or exceeding 140° C. are produced. The temperature must be high enough to drive off the grinding liquid.

(e) The dispersion may also be made directly by grinding the tin sulphide in the base oil. For example, a low surface tension, low boiling point mineral lubricating oil with a viscosity up to 600 centistokes at 100° F. (38° C.) can be used. Elevated temperatures up to 400° C. can be used during the grinding.

Methods (c), (d) and (e) are particularly preferred. In general, the oleophilic tin sulphide can be incorporated into the base oil either at ambient temperatures or, if desired, at elevated temperatures, for example, up to 400° C.

COMPOSITES

The amount of oleophilic tin sulphide incorporated into the metal or solid polymeric matrix may be as low as 0.1 and as high as 50% wt. but is preferably from 1 to 25% wt. based on the weight of matrix plus oleophilic tin sulphide.

The oleophilic tin sulphide can be incorporated into the metal or solid polymeric matrix by any suitable method. However, it is preferably incorporated into the matrix by the mechanical mixing of either wet or dry powders of the metals or solid polymeric materials with either wet or dry powders of the oleophilic tin sulphide. It is preferred to mix the powders wetted with a volatile solvent such as petroleum ether. The mixture may then be compressed, for example, in a die, after removal of any solvent, and sintered at a suitable temperature, for example, above 300° C. for a composite comprising a polytetrafluoroethylene matrix.

Bearings can be fabricated from such composites by any suitable method, for example, by machining or by making use of the compression die mentioned above.

The following examples serve to illustrate the invention.

Example 1

Dispersions of non-oleophilic and oleophilic tin sulphides were made up and their load-carrying properties compared using a Shell Four-ball machine. The testing method used was as described in Method 6503 which forms part of U.S. Federal Test Method Standard No. 791a, except that a period of 1 minute was used in one set of tests instead of 10 seconds.

TABLE

| No. | Dispersed [1] solid | Base oil | BET surface area of dispersed solid, m.$^2$/g. | Load-carrying properties of dispersion [2] | | | | | |
|---|---|---|---|---|---|---|---|---|---|
| | | | | Wear scar 60 min, 15 kg. | Wear scar, 1 min. | | | Mean Hertz load, kg. | Welding load kg |
| | | | | | 100 kg. | 150 kg. | 200 kg. | | |
| 1 | | Medicinal paraffin oil. | | 0.85 | 3.7 | Welds | Welds | 14 | 105 |
| 2 | 98% purity SnS$_2$, unground | do | 3 | 0.80 | 1.15 | 1.60 | 2.05 | 43 | 320 |
| 3 | 98% purity SnS$_2$, oleophilic [3] | do | 44 | 0.88 | 0.94 | 1.22 | 1.35 | 56 | 370 |
| 4 | Commercial SnS$_2$ (20% SnS), unground. | do | 7 | 0.90 | 0.90 | 1.05 | 1.20 | 55 | 300 |
| 5 | Commercial SnS$_2$ (20% SnS), olephilic.[3] | do | 22 | 0.70 | 0.94 | 1.10 | 1.25 | 66 | 650 |
| 6 | | B G 160/95 [4] | | 0.79 | 2.50 | Weld | Weld | 23 | 135 |
| 7 | SnS, vacuum ground | do | 7.5 | 0.67 | 1.90 | 2.26 | 2.58 | | |
| 8 | SnS, oleophilic [3] | do | 9 | 0.35 | 1.50 | 1.66 | 1.81 | | |
| 9 | Commercial SnS$_2$ (20% SnS), unground. | do | 7 | 0.32 | 1.56 | 2.10 | Welds | <50 | <200 |
| 10 | Commercial SnS$_2$ (20% SnS), oleophilic.[3] | do | 22 | 0.37 | 1.00 | 1.35 | 1.65 | 55 | 500 |

[1] The solids were made up as 5% wt. dispersions in the base oil.
[2] The tests were carried out at ambient temperature.
[3] Both the 98% purity and the commercial stannic sulphide were ground for 8 hours in n-heptane. The stannous sulphide was ground for 4 hours in n-heptane. Each of the sulphides was ground in Megapact vibratory ball mill. The n-heptane was removed by vigorous boiling.
[4] This was a mineral oil of Redwood I viscosity of 160 seconds at 140° F. (60° C.) and a viscosity index of 95.

It can be seen from this table that dispersions of oleophilic tin sulphides have generally superior load-carrying properties when compared with equivalent dispersions of non-oleophilic tin sulphides.

What I claim is:

1. A method of producing an oleophilic tin sulphide which comprises forming a mixture which consists of less than 50% by wt. of tin sulphide in an organic liquid distilling below 500° C., having a viscosity below 600 centistokes at 38° C., and having a surface tension below 72 dynes/cm at 25° C., grinding said sulphide in said liquid until said tin sulphide becomes oleophilic and has a surface area of from 5 to 400 square meters per gram.

2. An oleophilic tin sulphide produced by the method of claim 1.

3. A lubricating composition consisting of a lubricating oil containing an effective amount of an oleophilic tin sulphide produced by the method of claim 1.

References Cited

UNITED STATES PATENTS

| 3,384,579 | 5/1968 | Groszek | 252—25 |
| 3,384,582 | 5/1968 | Groszek | 252—25 |

DANIEL E. WYMAN, Primary Examiner

I. VAUGHN, Assistant Examiner

U.S. Cl. X.R.

23—134

UNITED STATES PATENT OFFICE
CERTIFICATE OF CORRECTION

Patent No. 3,518,187              Dated June 30, 1970

Inventor(s) Aleksander Jerzy Groszek

It is certified that error appears in the above-identified patent and that said Letters Patent are hereby corrected as shown below:

Column 1, line 17, "posses" should read -- possess --. Column 2, line 57, "olephilic" should read -- oleophilic --; line 64, "olephilic" should read -- oleophilic --. Columns 3 and 4, in the Table, next to the last column, No. 9, "<50" should read -- <30 --; and columns 3 and 4, in the Table, last column, No. 10, "500" should read -- 400 --.

Signed and sealed this 5th day of January 1971.

(SEAL)
Attest:

EDWARD M. FLETCHER, JR.
Attesting Officer

WILLIAM E. SCHUYLER, JR.
Commissioner of Patents